(12) United States Patent
Hotnog (10) Patent No.: US 12,359,725 B2
(45) Date of Patent: Jul. 15, 2025

(54) WIPER SEAL FOR A BALL SCREW ACTUATOR

(71) Applicant: TRELLEBORG SEALING SOLUTIONS US, INC., Ft. Wayne, IN (US)

(72) Inventor: Tudor B. Hotnog, Lake Balboa, CA (US)

(73) Assignee: TRELLEBORG SEALING SOLUTIONS US, INC., Ft. Wayne, IN (US)

( * ) Notice: Subject to any disclaimer, the term of this patent is extended or adjusted under 35 U.S.C. 154(b) by 5 days.

(21) Appl. No.: 18/419,518

(22) Filed: Jan. 22, 2024

(65) Prior Publication Data

US 2024/0247719 A1 Jul. 25, 2024

Related U.S. Application Data (60) Provisional application No. 63/481,562, filed on Jan. 25, 2023.

(51) Int. Cl.
| | |
|---|---|
| *F16J 15/3232* | (2016.01) |
| *F16H 25/24* | (2006.01) |
| *F16J 15/3284* | (2016.01) |

(52) U.S. Cl.
CPC ...... *F16J 15/3232* (2013.01); *F16H 25/2418* (2013.01); *F16J 15/3284* (2013.01)

(58) Field of Classification Search
CPC .. F16J 15/3232; F16J 15/3284; F16J 15/3244; F16H 25/2418
See application file for complete search history.

(56) References Cited

U.S. PATENT DOCUMENTS

| | | | |
|---|---|---|---|
| 4,905,533 A | 3/1990 | Benton et al. | |
| 6,976,399 B2 | 12/2005 | Michioka et al. | |
| 8,025,128 B2 | 9/2011 | Iwasaki | |
| 10,612,633 B2 | 4/2020 | Nishide et al. | |
| 10,975,941 B2* | 4/2021 | Fages | F16J 15/32 |
| 11,506,312 B2* | 11/2022 | Piontek | F16L 21/02 |

(Continued)

FOREIGN PATENT DOCUMENTS

| | | |
|---|---|---|
| EP | 1 959 172 A1 | 8/2008 |
| EP | 3 392 526 B1 | 8/2020 |

(Continued)

*Primary Examiner* — Gilbert Y Lee
(74) *Attorney, Agent, or Firm* — Orbit IP, LLP; Marc G. Martino (57) ABSTRACT

A wiper seal assembly for sealing a ball screw actuator includes a wiper element. An inside circumferential surface has a first helically shaped extension extending towards a longitudinal axis and is configured to be disposed within a roller ball screw thread. A plurality of micro-grooves is formed on the inside circumferential surface. An ice breaker element on its inside circumferential surface has a second helically shaped extension extending towards the longitudinal axis and is configured to be disposed within the roller ball screw thread. The second helically shaped extension extends to the front side of the ice breaker element forming an ice breaker lip. The wiper element is disposed adjacent to the ice breaker element. The wiper element and ice breaker element are mechanically locked in rotation in comparison to one another.

20 Claims, 12 Drawing Sheets

(56) References Cited

U.S. PATENT DOCUMENTS

| | | |
|---|---|---|
| 11,655,884 B2 | 5/2023 | Lee |
| 2008/0196523 A1 | 8/2008 | Liu |
| 2014/0352470 A1 | 12/2014 | Hsieh |
| 2015/0042045 A1 | 2/2015 | Inoue et al. |
| 2015/0233457 A1 | 8/2015 | Heck et al. |

FOREIGN PATENT DOCUMENTS

| | | |
|---|---|---|
| EP | 3 428 481 B1 | 8/2021 |
| JP | 3647597 B2 | 5/2005 |
| JP | 4923624 B2 | 4/2012 |
| JP | 3238897 U | 8/2022 |
| KR | 10-1584435 B1 | 1/2016 |

\* cited by examiner

WIPER SEAL FOR A BALL SCREW ACTUATOR

CROSS-REFERENCE TO RELATED APPLICATIONS

This application claims priority to provisional application 63/481,562 filed Jan. 25, 2023, the entire contents of which are hereby incorporated in full by this reference.

DESCRIPTION

Field of the Invention

The present invention generally relates to seals. More particularly, the present invention relates to a ball screw seal for a ball screw actuator used in aerospace applications.

Background of the Invention

Ball screw actuators need seals to seal grease within the actuator. Furthermore, these seals should be able to break externally formed ice while keeping external debris from ingressing (i.e., entering) into the actuator and other flight systems. Current solutions that have been designed are not fully successful in applications with high temperature variability and have had issues with drag, especially in low temperature applications where high drag is due to ball screw wiper material shrinkage. The present invention overcomes these drawbacks.

Prior art publication and patents include but are not limited to the following: EP 3 392 526 B1; EP 3 428 481 B1; U.S. Pat. Nos. 4,905,533; 10,612,633; KR 101 584 435 B1; U.S. Pat. No. 6,976,399B2; JP 492 362 4B2; JP 492 362 4B2; US 201 403 524 70A1; JP 364 759 7B2; U.S. Pat. Nos. 8,025,128B2; 4,905,533A; and EP 3 428 481 B1.

SUMMARY OF THE INVENTION

An embodiment of the present invention is a wiper seal assembly 10 configured for sealing a ball screw actuator 11. A wiper element 12 is annularly disposed about a longitudinal axis 13. The wiper element defines a front side 14 opposite a back side 15, the front and back sides being generally perpendicular to the longitudinal axis. The wiper element further defines an outside circumferential surface 16 opposite an inside circumferential surface 17, the outside and inside circumferential surfaces being generally parallel with longitudinal axis. The inside circumferential surface comprises a first helically shaped extension 18 extending towards the longitudinal axis, where the first helically shaped extension is configured to be disposed within a roller ball screw thread 19 of a shaft 20 of the ball screw actuator, and where the shaft is configured to be aligned along the longitudinal axis. At least a portion 21 of the first helically shaped extension comprises a plurality of micro-grooves 22 formed on the inside circumferential surface, wherein the plurality of micro-grooves is configured to make contact with the roller, i.e., the ball screw thread of the shaft of the ball screw actuator.

An ice breaker element 23 is annularly disposed about the longitudinal axis. The ice breaker element defines a front side 24 opposite a back side 25, the front and back sides being generally perpendicular to the longitudinal axis. The ice breaker element defining an outside circumferential surface 26 opposite an inside circumferential surface 27, the outside and inside circumferential surfaces being generally parallel with longitudinal axis. The inside circumferential surface comprises a second helically shaped extension 28 extending towards the longitudinal axis, wherein the second helically shaped extension is configured to be disposed within the roller ball screw thread of the shaft of the ball screw actuator. The second helically shaped extension extends to the front side of the ice breaker element forming an ice breaker lip 29. The wiper element is disposed adjacent to the ice breaker element with the back side of the wiper element being adjacent to the back side of the ice breaker element. The wiper element and ice breaker element are mechanically locked in rotation in comparison to one another.

In another exemplary embodiment, the plurality of micro-grooves may be adjacently disposed next to one another, each micro-groove of the plurality of micro-grooves being annularly disposed about the longitudinal axis and not following a helical profile 30. In other words, each micro-groove is annularly shaped and disposed next to another annularly shaped micro-groove.

In another exemplary embodiment, the plurality of micro-grooves may follow a helical profile 30 that is in a similar helical direction 31 in comparison to the first helically shaped extension. Alternatively, the plurality of micro-grooves may follow a helical profile 30 that is in an opposite helical direction 32 in comparison to the first helically shaped extension.

In another exemplary embodiment, the first helically shaped extension may be helically aligned in comparison to the second helically shaped extension, wherein both the first and second helically shaped extensions are configured to be disposed within the roller ball screw thread of the shaft of the ball screw actuator.

In another exemplary embodiment, an edge 33 of the ice breaker lip may be configured to be at or less than 0.012 inches (0.30 millimeters) from the roller ball screw thread of the shaft of the ball screw actuator.

In another exemplary embodiment, the front side of the wiper element may include an annular channel 34 formed therein disposed about the longitudinal axis. An annularly shaped metallic spring element 35 may be disposed within the annular channel. The spring element may comprise a flat ribbon coil spring 36. The spring element may comprise a U-shape 37 in cross section, wherein an open top 38 of the U-shape is pointing along the longitudinal axis and away from the back side of the wiper element. The front side of the wiper element may comprise an outer diameter grease sealing lip 39 and an inner diameter grease sealing lip 40 separated by the annular channel.

The wiper element and the ice breaker element may not be of the same materials. The wiper element may comprise PTFE, unfilled PTFE, blended PTFE, glass moly filled PTFE, PEEK and/or thermoplastic material. The ice breaker element may comprise aluminum bronze and/or stainless steel.

The wiper seal assembly may be installed between an outer housing 41 and the shaft of the ball screw actuator, where the front side of the wiper element is configured to be disposed towards a grease side 42 and the front side of the ice breaker element is configured to be disposed towards an environmental side 43.

At least (two) one finger(s) 44 may extend parallel to the longitudinal axis from the back side of the ice breaker element towards the wiper element. At least one recess 45 may be formed in the back side of the wiper element, wherein the at least one finger of the ice breaker element is disposed within the at least one recess of the wiper element and mechanically locks in rotation the wiper element in comparison to the ice breaker element.

At least (two) one tab(s) 46 may extend radially to the longitudinal axis from the outside circumferential surface of the ice breaker element, wherein the at least one tab is configured to be disposed within at least one recess 47 formed in an outer housing 41 and mechanically locks in rotation the ice breaker element in comparison to the outer housing.

BRIEF DESCRIPTION OF THE DRAWINGS

The accompanying drawings illustrate the invention. In such drawings.

DETAILED DESCRIPTION OF EMBODIMENTS OF THE INVENTION

Reference is now made to FIGS. 1-13 of the provisional application 63/481,562. The present invention is an easy to install press fit seal that has a spring energized outer diameter grease sealing lip and low temperature ice breaking lip on the back end. The present invention is designed as a two-piece solution to avoid locking issues. The seal is designed to be reliable in low torque and low temp solutions. The invention includes a ball screw wiper energized by a metallic "U" shape spring, or a metallic flat ribbon coil spring is to assist PTFE sealing element to provide low temperature sealing on the ball nut housing.

The purpose of having a metallic ice breaker on the back of the sealing wiper is protect the PTFE sealing element by break the ice from formed on the screw when the screw is rotating. The ball screw wiper and an ice breaker are mechanically locked by a numbers of ice breaker fingers that inserted on same numbers of grooves machined on the back of ball screw wiper component. The ball screw wiper and ice breaker are in perfect timing to eliminate the possibility of the ice breaker to act like a lock nut. This feature is created by positioning of a timing feature created by one of locking finger element.

One feature of this invention is the mini-grooves across the entire wiper seal inside profile providing multiple wipers and reducing wiper seal component friction torque at low temperature due to reducing wiper seal surface contact area.

Figure 1:
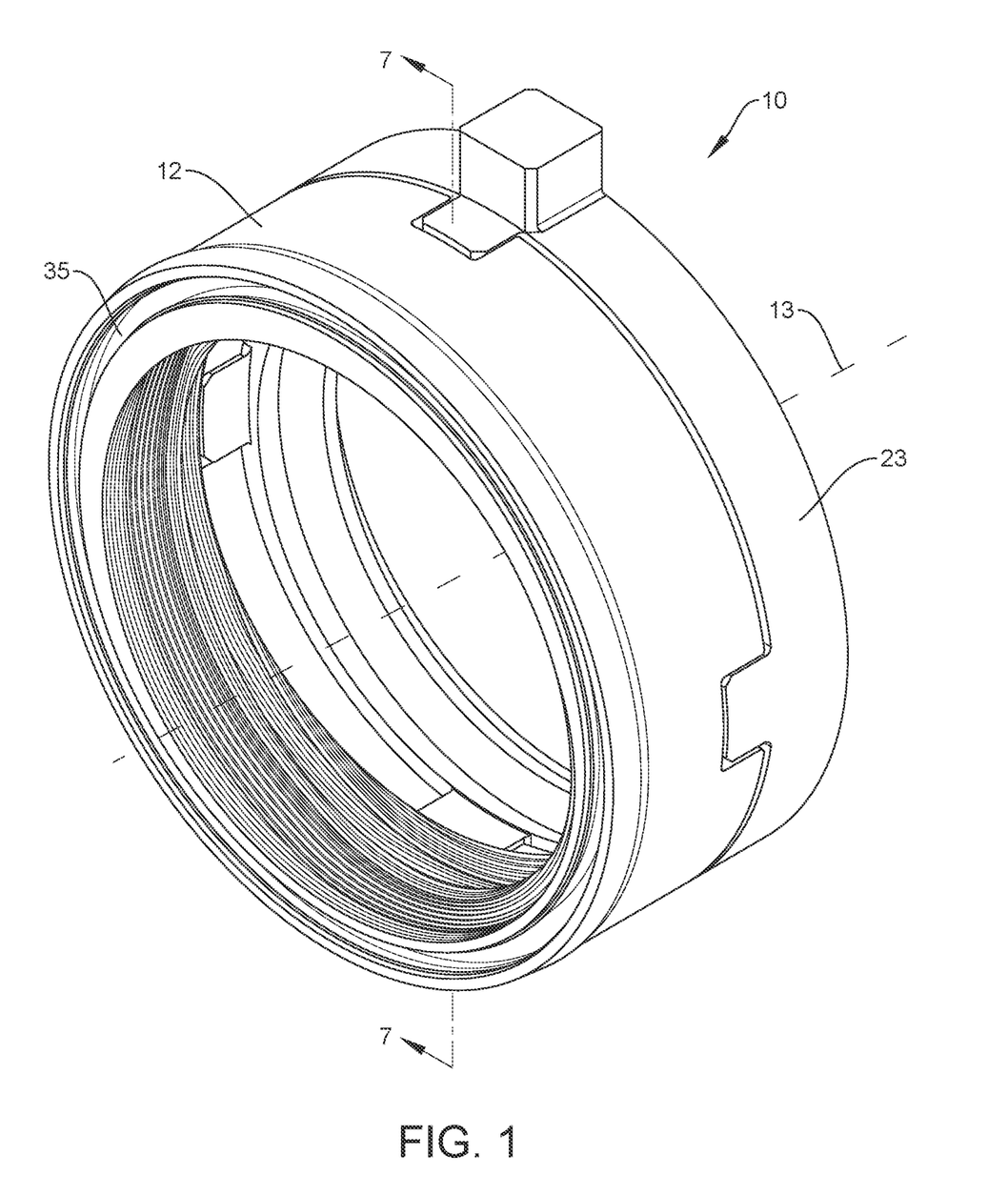
FIG. 1 is an isometric view of an embodiment of a wiper seal assembly of the present invention.

FIG. 1 is a front isometric view of the seal of the present invention. As shown are a first part being a PTFE wiper seal component in light blue that is connected to a second part being an ice breaker component shown in tan. The PTFE seal component is mechanically locked with the ice breaker component by an equal number of seal wiper heel grooves and ice breaker fingers. The mechanical locking feature is not a press fit and it is a loose fit. Depending on the application requirement, the wiper seal material could be unfilled PTFE, blended PTFE and/or thermoplastic material.

This sealing element has a positive sealing of the ball screw housing due to seal outside configuration. The inside seal profile due to the screw configuration "seal" profile looks like a thread. In the other words, it is not a closed loop and that why is called a wiper seal because it is pushing the grease inside the ball screw housing.

The wiper assembly shown in FIG. 1 is comprised by three components. First, there is the ball wiper seal. The material has a high percentage Glass Moly filled PTFE, or thermoplastic material such as PEEK to reduce wiper material shrinkage due to low temperature preventing increasing the ball screw torque.

Second, there is a metallic spring inside a cavity of the wiper seal configured to prevent wiper outer diameter shrinkage causing external leakage. The spring element installed inside the wiper seal is pushing equally outside and inside the wiper seal. At low temperatures, the metallic spring component will prevent the wiper outside diameter from shrink. Metallic Spring materials used are 300 SST., 17-7PH SST or 17-4PH SST, Elgiloy Inconel.

Third, there is an ice breaker manufactured from aluminum bronze or stainless steel, to break the ice behind the wiper preventing ice particles and water getting into ball screw housing and thus damaging the ball bearings. Furthermore, an additional function of the ice breaker is to prevent the wiper seal from rotating with the ball screw shaft (i.e., antirotating). The wiper seal is mechanical locked via heel grooves with the ice breaker fingers. All wiper seal and ice breaker combinations are locked into the ball screw housing by the external ears or fingers that are going into housing provided grooves.

Additionally, the ice breaker has a higher clearance between the shaft screw and the ice breaker. The ice breaker should a higher clearance between the ball screw profile and the ice breaker inside profile to prevent the ice breaker inside profile from being in contact with the ball screw profile thereby scratching/damaging the ball screw profile during turning process.

Figure 2:
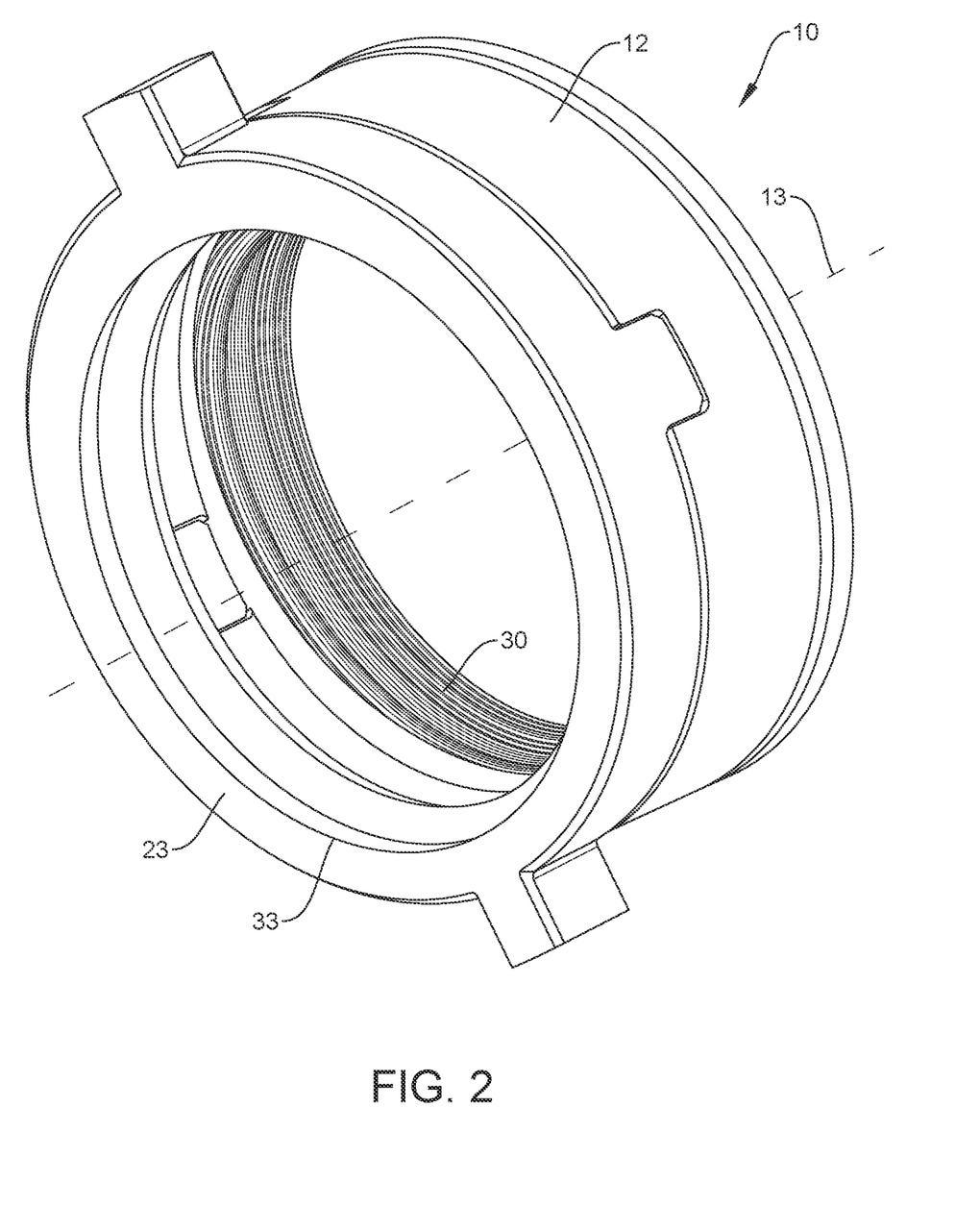
FIG. 2 is another isometric view of the structure of FIG. 1 taken from a rearward viewpoint.

FIG. 2 is a rear isometric view of the structure of FIG. 1.

Figure 3:
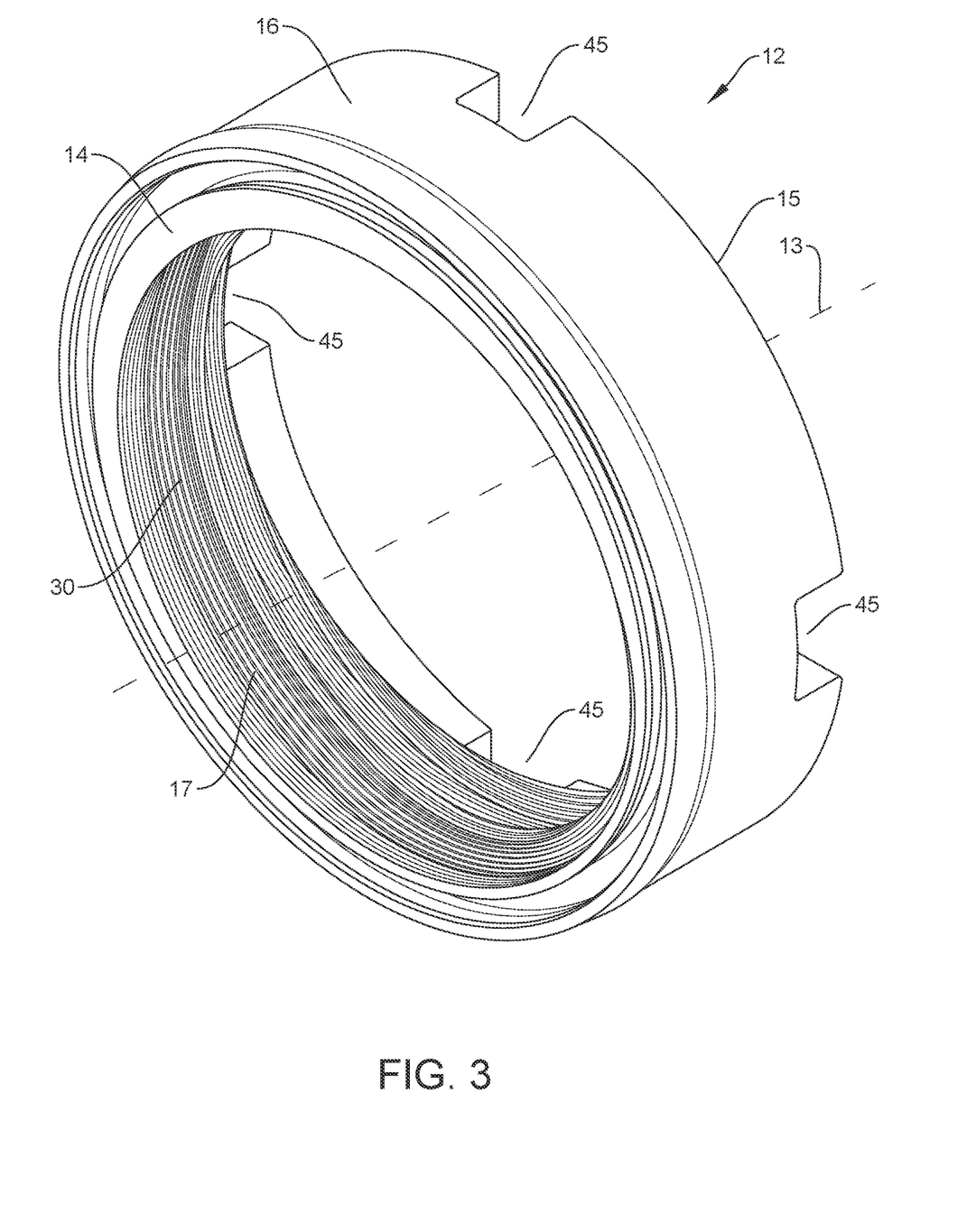
FIG. 3 is an isometric view of just the wiper element from the structure of FIG. 1.

FIG. 3 is a front isometric view of just the ball screw wiper.

Figure 4:
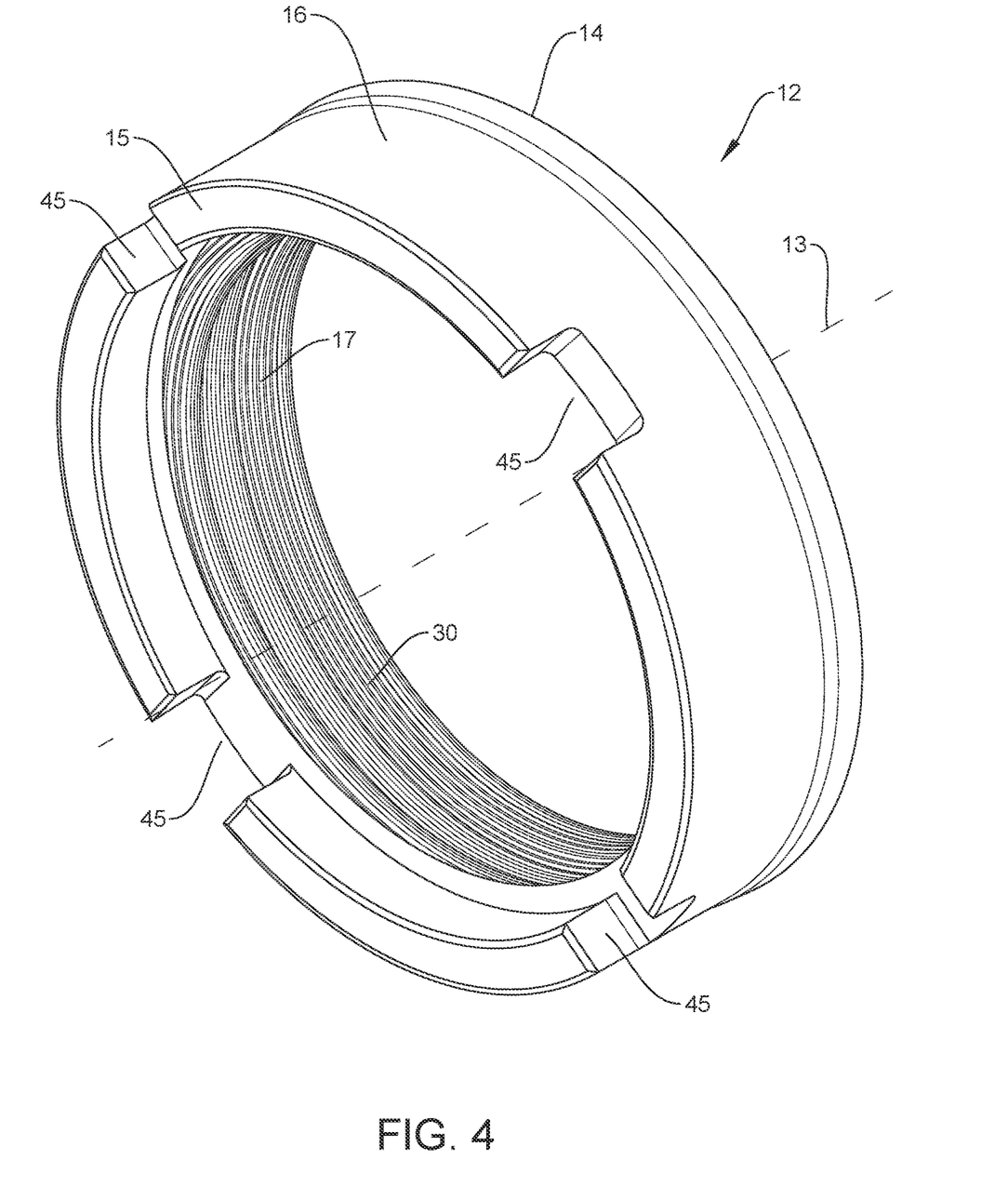
FIG. 4 is another isometric view of the structure of FIG. 3 taken from a rearward viewpoint.

FIG. 4 is a rear isometric view of the structure of FIG. 3.

Figure 5:
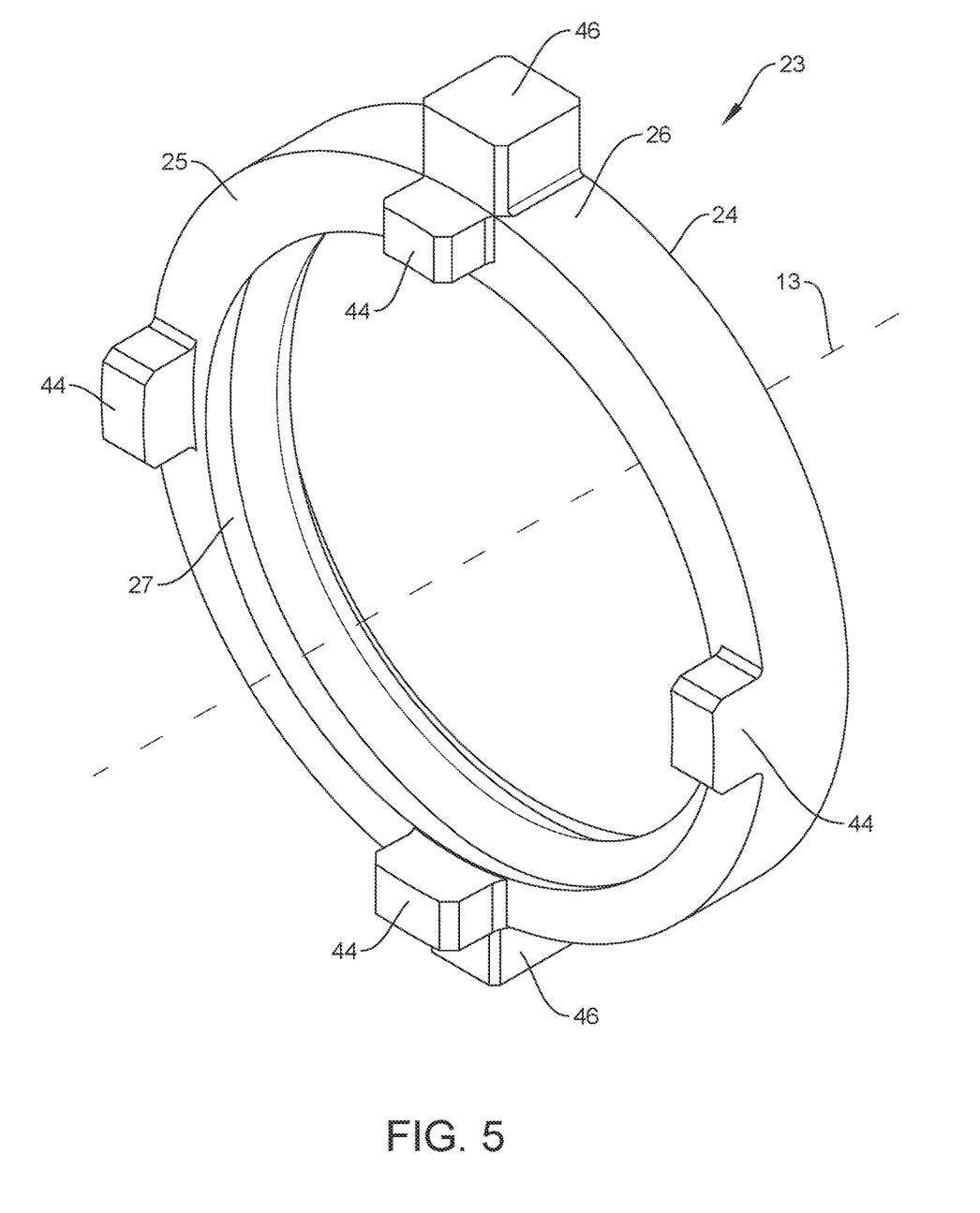
FIG. 5 is an isometric view of just the ice breaker element from the structure of FIG. 1.

FIG. 5 is a front isometric view of just the ice breaker. The ice breaker shown here has four locking fingers and two radial tabs to lock inside the ball screw housing preventing the wiper seal and ice breaker to turn with the ball screw. Here, one can see that there are two protrusions (i.e., tabs) extending radially from the outer diameter surface of the part. These two protrusions are used to prevent the wiper seal and ice breaker to turn with the ball screw. Furthermore, there are four protrusions (i.e., fingers) that extend parallel to the longitudinal axis. These four protrusions are matched to fit within recesses in the first part. Therefore, both components are configured to lock together in a loose fit with perfect timing feature.

Figure 6:
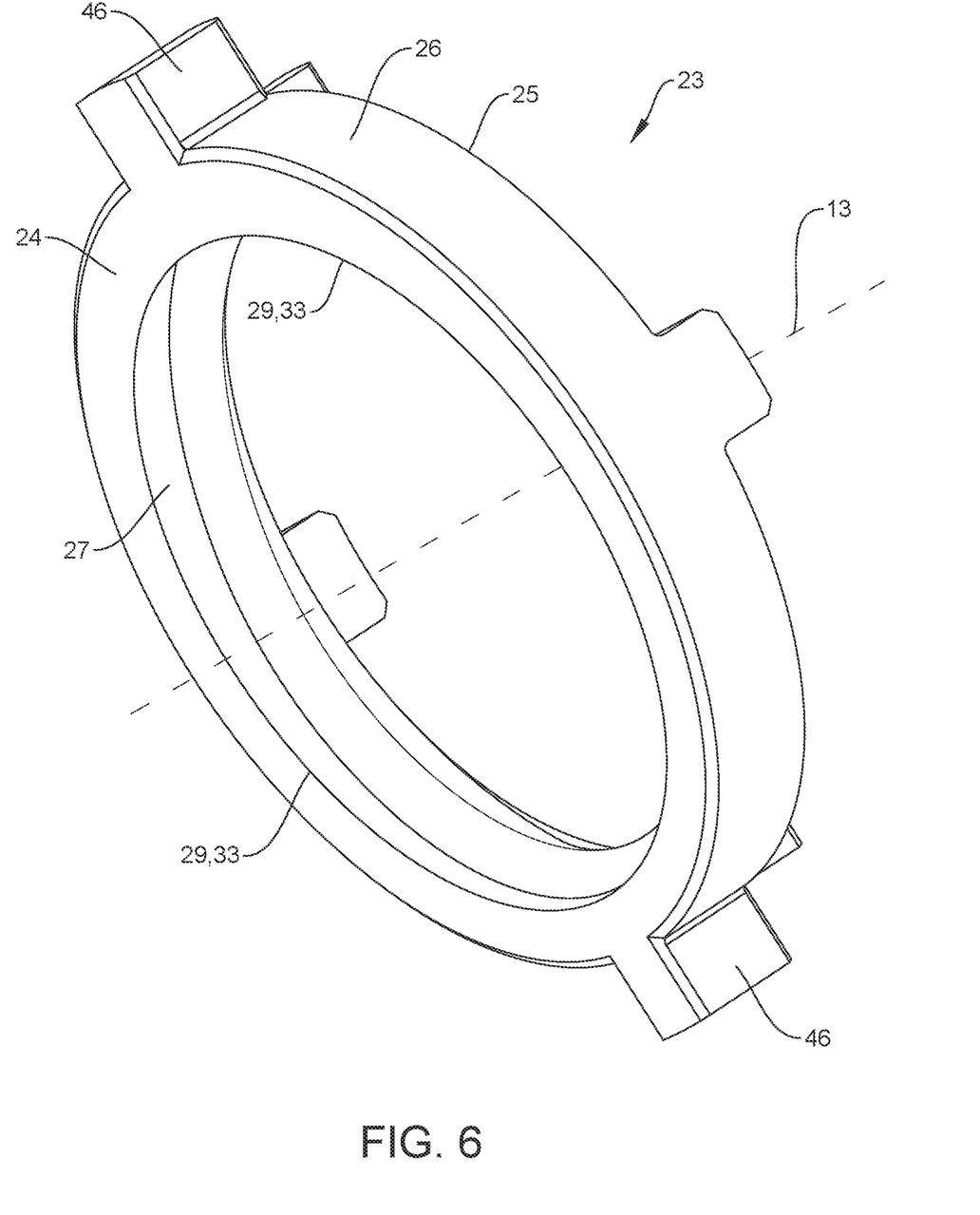
FIG. 6 is another isometric view of the structure of FIG. 5 taken from a rearward viewpoint.

FIG. 6 is a rear isometric view of the structure of FIG. 5.

Figure 7:
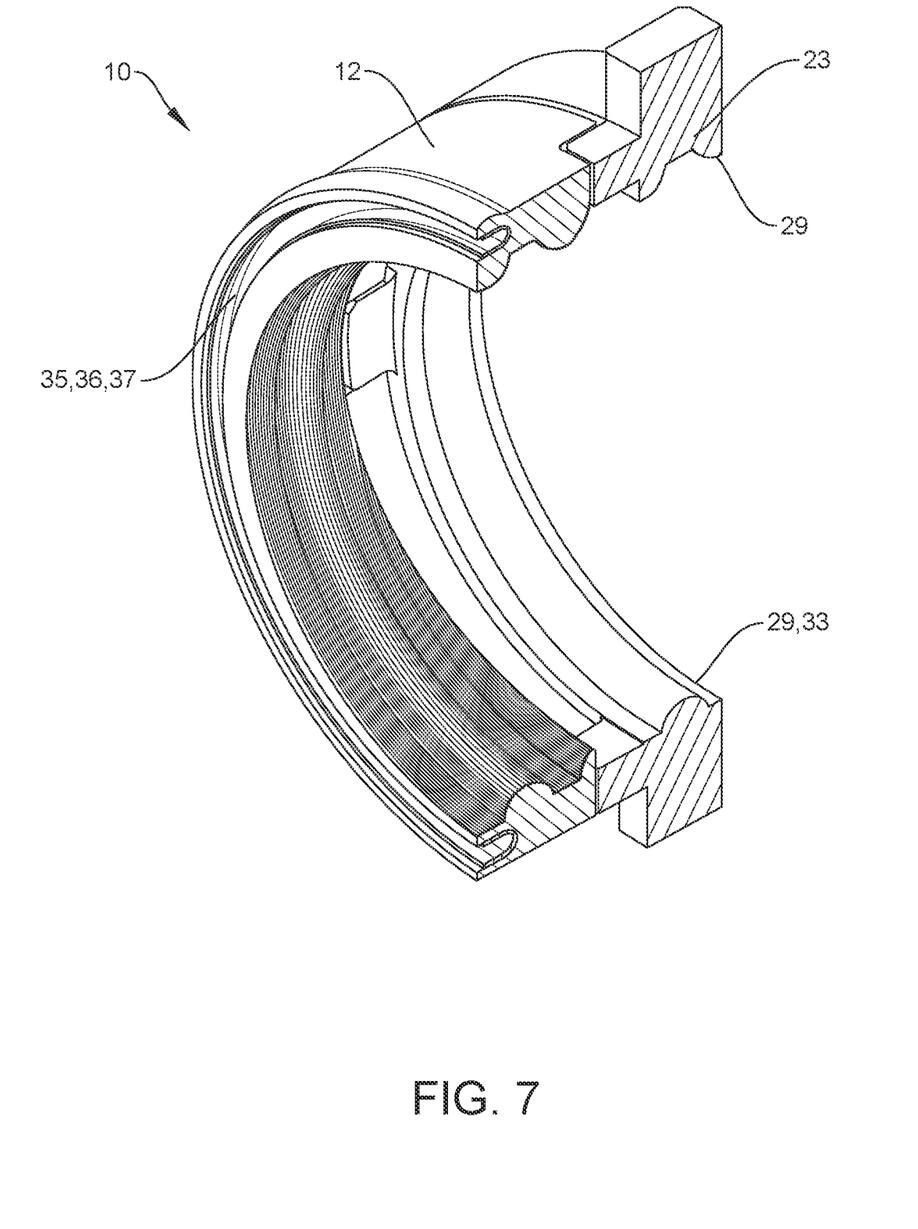
FIG. 7 is a sectional view taken from the structure of FIG. 1 along lines 7-7.

FIG. 7 is a sectional view taken through FIG. 1. This image is showing a cross sectional view with the complete wiper seal/ice breaker and spring assembly. One can also see the mini-groove configuration which is a novel feature of the present invention.

Figure 8:
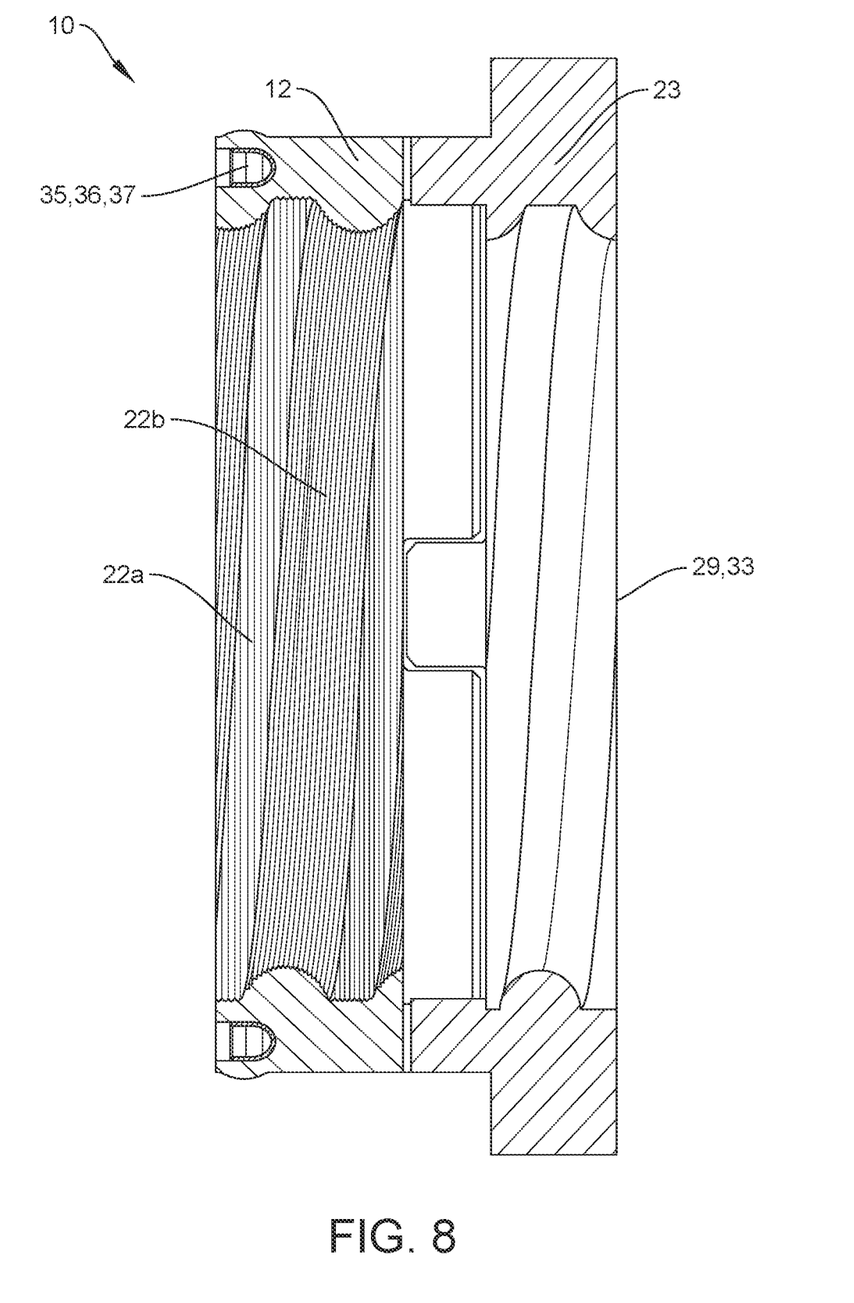
FIG. 8 is a side view of the sectional view of FIG. 7.

FIG. 8 is a side view of the structure of FIG. 7.

Figure 9:
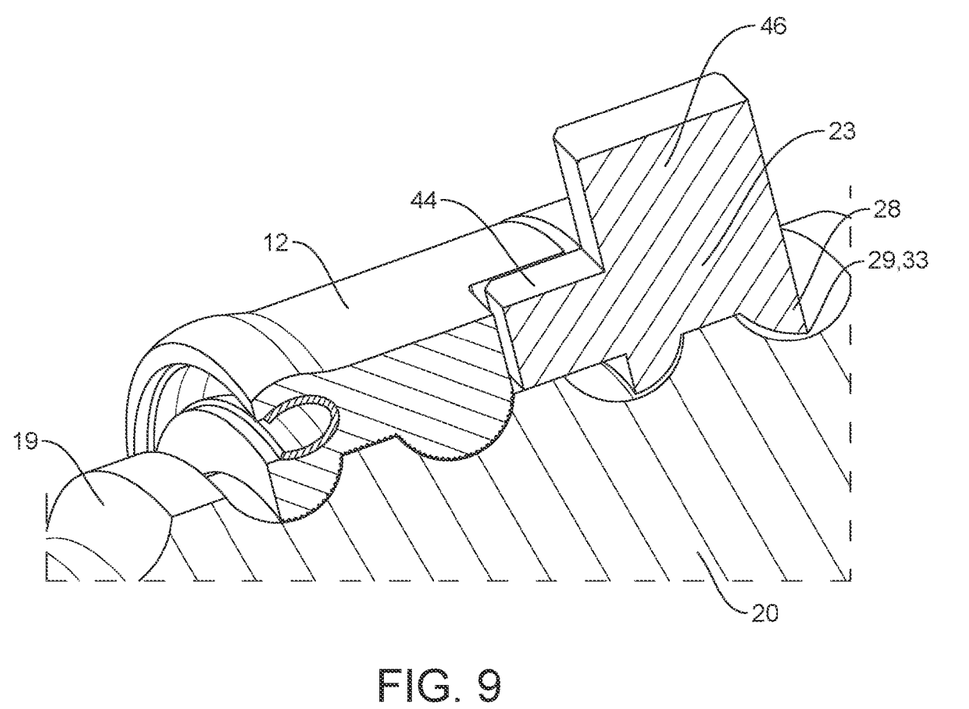
FIG. 9 is an isometric and enlarged view of the structure of FIG. 7 now including a shaft of the ball screw actuator.
Figure 10:
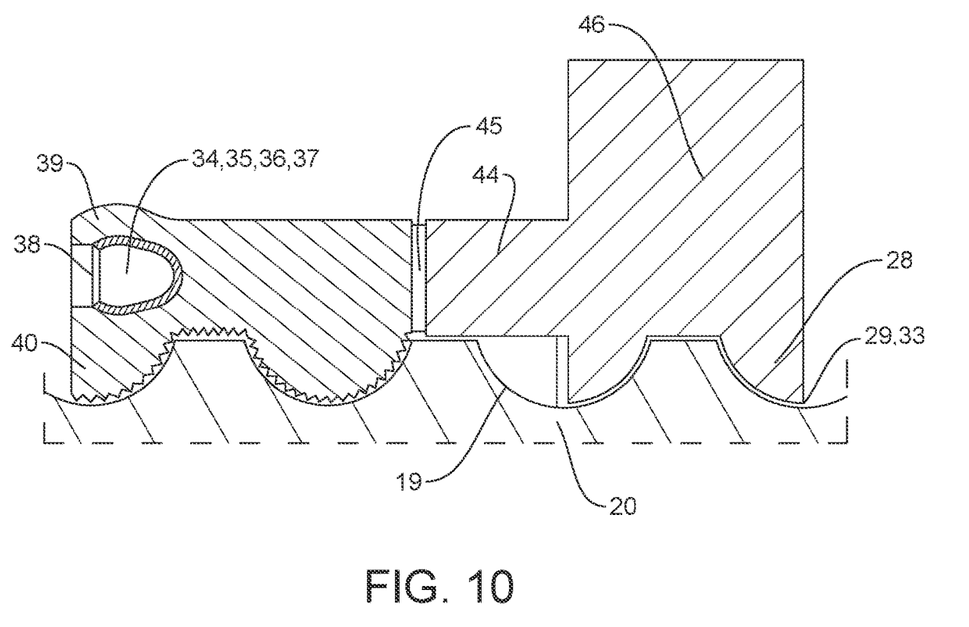
FIG. 10 is a side view of the structure of FIG. 9.

FIG. 9 is an enlarged sectional view similar to FIG. 7 now showing a cross sectional view of the present invention where one can better see the mini-grooves formed as part of the ball screw wiper. FIG. 10 is a side view of the structure of FIG. 9.

Figure 11:
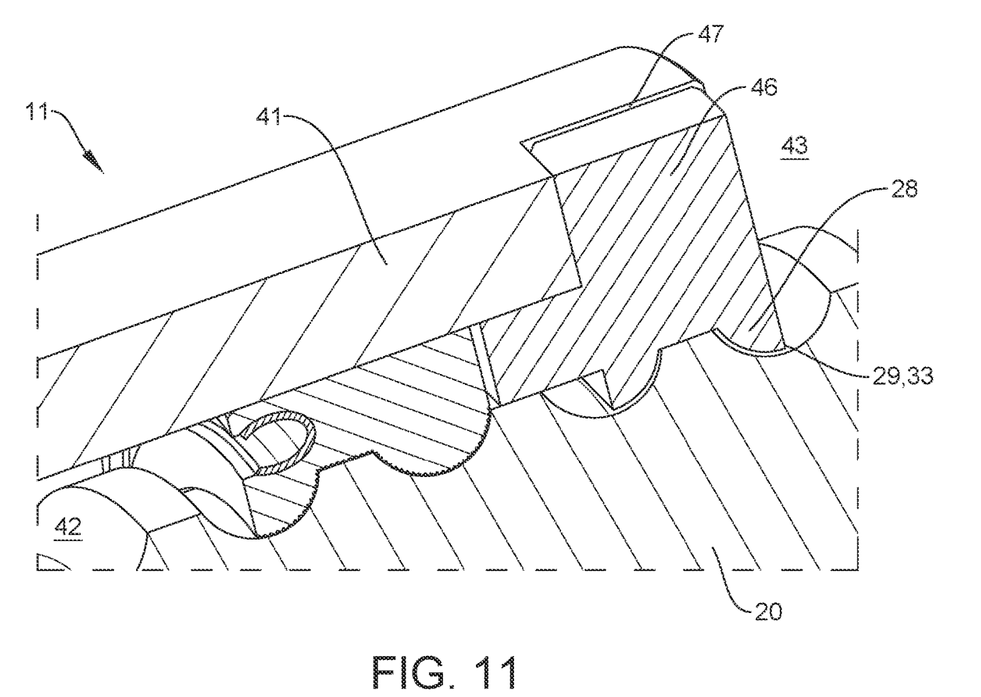
FIG. 11 is an isometric and enlarged view of the structure of FIG. 7 similar to that of FIG. 9, now including an outer housing of the ball screw actuator.
Figure 12:
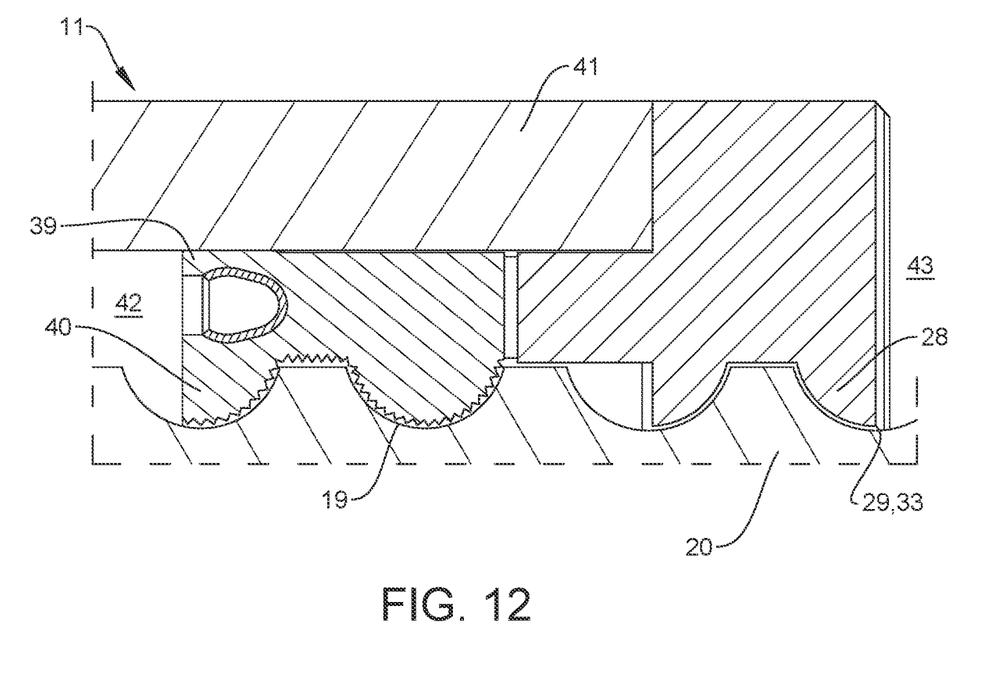
FIG. 12 is a side view of the structure of FIG. 11.

FIG. 11 is enlarged sectional view similar to FIG. 9 now showing the assembly installed in a ball seal actuator housing. FIG. 12 is a side view of the structure of FIG. 11. FIGS. 11 and 12 show the complete wiper seal/ice breaker and spring assembly over the ball screw.

It has been known to use mini-grooves on flat seal surfaces. However, it is not known to use mini-grooves on the feature of the wiper thread profile which in this case is a roller ball screw thread. When the inner diameter screw is turning in one direction then part of thread profile will be in full contact with the shaft screw profile thus increasing the torque value. Adding mini-grooves will reduce wiper contact by half.

The mini-grooves of the present invention may follow a helix thread profile, that is either in the same helix as the ball screw thread (or in the opposite direction as the ball screw thread). Alternatively, the mini-grooves may be annularly aligned whereas the ball screw thread will have the helix head profile. Furthermore, the mini-grooves may be aligned to follow the ball screw thread helix thread profile. As can be appreciated by those skilled in the art, a large variety of mini-groove thread profiles are possible.

A second benefit of the mini-grooves is also a wiping effect because they are like multiple scraping lips, such that the contaminants from the environment will have a harder time penetrating inside the ball screw wiper assembly and likewise grease will have a harder time escaping from the ball screw wiper assembly.

Reference is now being made to the figures of the present application which are very similar to the figures of the '562 provisional application. FIGS. 1-13 of the present application illustrate an embodiment of the present invention, which is a wiper seal assembly 10 configured for sealing a ball screw actuator 11 best seen in FIGS. 11-21.

As best seen in FIGS. 3 and 4, a wiper element 12 is annularly disposed about a longitudinal axis 13. The wiper element defines a front side 14 opposite a back side 15. The front and back sides are generally perpendicular to the longitudinal axis. The wiper element further defines an outside circumferential surface 16 opposite an inside circumferential surface 17. The outside and inside circumferential surfaces are generally parallel with longitudinal axis.

Figure 13:
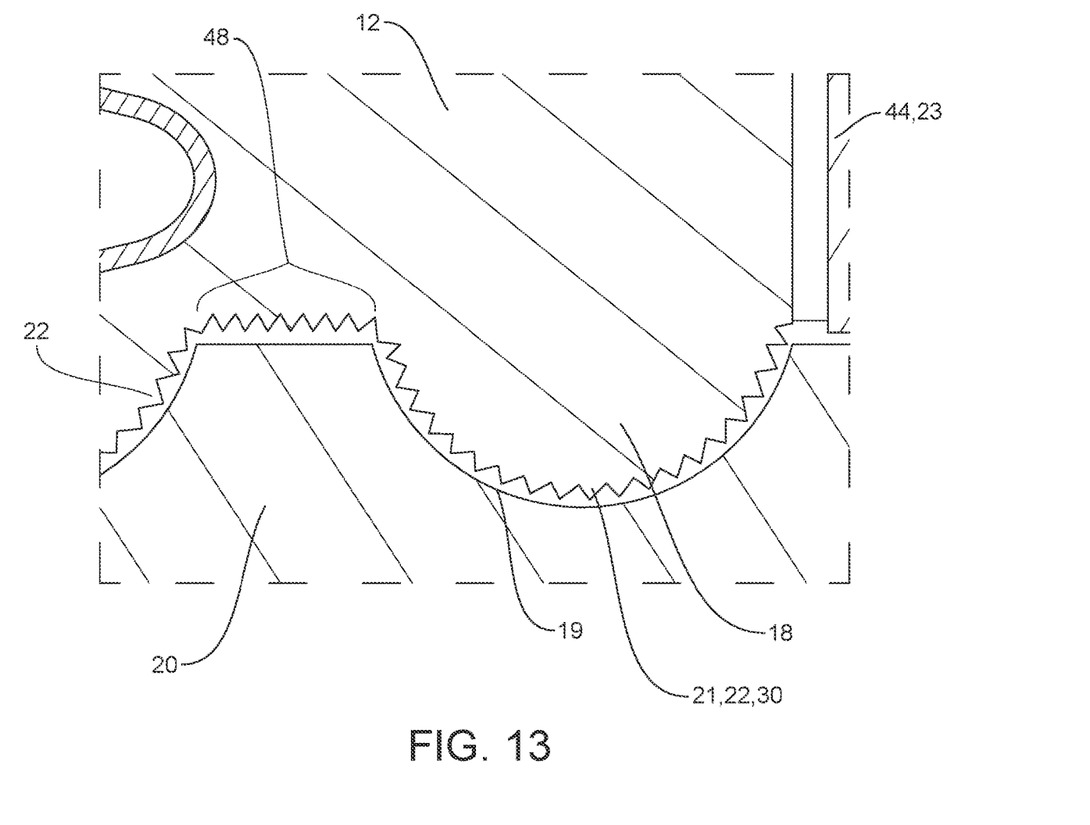
FIG. 13 is an enlarged view of the structure of FIG. 12 better showing the plurality of micro-grooves of the seal element.

As best seen in FIGS. 11-13, the inside circumferential surface comprises a first helically shaped extension 18 extending towards the longitudinal axis. The first helically shaped extension is configured to be disposed within a roller ball screw thread 19 of a shaft 20 of the ball screw actuator, where the shaft is configured to be aligned along the longitudinal axis. At least a portion 21 of the first helically shaped extension comprises a plurality of micro-grooves 22 formed on the inside circumferential surface. The plurality of micro-grooves is configured to make contact with the roller ball screw thread of the shaft of the ball screw actuator.

As best seen in FIGS. 5 and 6, an ice breaker element 23 is annularly disposed about the longitudinal axis. The ice breaker element defines a front side 24 opposite a back side 25. The front and back sides are generally perpendicular to the longitudinal axis. The ice breaker element further defines an outside circumferential surface 26 opposite an inside circumferential surface 27. The outside and inside circumferential surfaces are generally parallel with longitudinal axis.

As best seen in FIGS. 11-12, the inside circumferential surface comprises a second helically shaped extension 28 extending towards the longitudinal axis. The second helically shaped extension is configured to be disposed within the roller ball screw thread of the shaft of the ball screw actuator.

As shown in FIG. 6, the second helically shaped extension extends to the front side of the ice breaker element forming an ice breaker lip 29. The wiper element is disposed adjacent to the ice breaker element with the back side of the wiper element being adjacent to the back side of the ice breaker element. The wiper element and ice breaker element are mechanically locked in rotation in comparison to one another as will be further explained below.

The plurality of micro-grooves may be adjacently disposed next to one another, where each micro-groove of the plurality of micro-grooves is annularly disposed about the longitudinal axis and not following a helical profile 30. In another exemplary embodiment, the plurality of micro-grooves may follow a helical profile 30 that is in a similar helical direction 31 in comparison to the first helically shaped extension. Alternatively, the plurality of micro-grooves may follow a helical profile 30 that is in an opposite helical direction 32 in comparison to the first helically shaped extension.

Both the first and second helically shaped extensions are disposed within the same roller ball screw thread. Thus, the first helically shaped extension is helically aligned in comparison to the second helically shaped extension, wherein both the first and second helically shaped extensions are configured to be disposed within the roller ball screw thread of the shaft of the ball screw actuator.

Referring to FIG. 10, an edge 33 of the ice breaker lip may be configured to be at or less than 0.012 inches (0.30 millimeters) from the roller ball screw thread of the shaft of the ball screw actuator. The edge 33 should not come into contact with the roller ball screw thread but should be very close such that any debris and/or ice can be scraped off.

Referring to FIG. 10, the front side of the wiper element may include an annular channel 34 formed therein disposed about the longitudinal axis. An annularly shaped metallic spring element 35 may be disposed within the annular channel. The spring element may comprise a flat ribbon coil spring 36. The spring element may comprise a U-shape 37 in cross section, wherein an open top 38 of the U-shape is pointing along the longitudinal axis and away from the back side of the wiper element.

Due to the annular channel 34, the front side of the wiper element is split into two halves, where it has an outer diameter grease sealing lip 39 and an inner diameter grease sealing lip 40 separated by the annular channel. The spring elements 35 can then either push the lip 39 up into the outer housing, push the lip 40 down into the shaft or do both.

The wiper element and the ice breaker element may not be of the same materials. The wiper element may comprise PTFE, unfilled PTFE, blended PTFE, glass moly filled PTFE, PEEK and/or thermoplastic material. The ice breaker element may comprise aluminum bronze and/or stainless steel.

The wiper seal assembly is installed between an outer housing 41 and the shaft of the ball screw actuator. The front side of the wiper element is configured to be disposed towards a grease side 42 and the front side of the ice breaker element is configured to be disposed towards an environmental side 43.

Referring to FIGS. 5-6, at least one finger 44 may extend parallel to the longitudinal axis from the back side of the ice breaker element towards the wiper element. Here, there are shown four fingers 44. One, two, three, four or any number of fingers could be used as will be understood by those skilled in the art.

Referring to FIGS. 3-4, at least one recess 45 may be formed in the back side of the wiper element. The at least one (two) finger(s) of the ice breaker element is disposed within the at least one recess of the wiper element and mechanically locks in rotation the wiper element in comparison to the ice breaker element. Similar to the fingers, the recesses 45 may be of one, two, three, four or any number of recesses as will be understood by those skilled in the art.

Referring again to FIGS. 5 and 6, at least one tab 46 may extend radially to the longitudinal axis from the outside circumferential surface of the ice breaker element. It is understood by those skilled in the art that one, two, three, four or any number of tabs could be used. The at least one tab is configured to be disposed within at least one recess 47 formed in an outer housing 41 as shown in FIG. 11 and mechanically locks in rotation the ice breaker element in comparison to the outer housing.

Referring to FIG. 13, the micro-grooves are formed along the first helically shaped extension 18 and they are also formed along the flat cylindrical portion 48. The micro-grooves may be shaped similar along the portions 18 and 48, or formed differently along the portions 18 and 48. FIGS. 14A-14F help illustrate some of the various embodiments the micro-grooves may take.

Figure 14A:
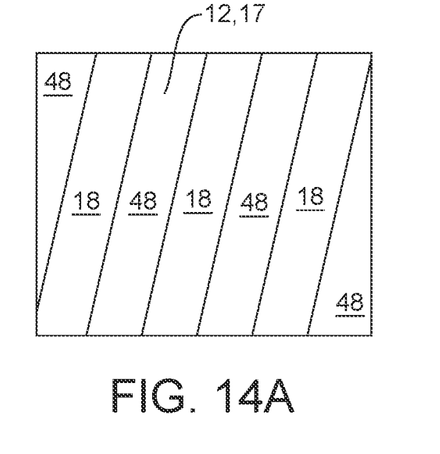
FIG. 14A is a theoretical plan view of the inside circumferential surface of the wiper element with no micro-grooves.

FIG. 14A is a simplified representation of what the inside circumferential surface 17 of the wiper element 12 would look like if it had no micro-grooves formed on its surface and it was cut in half and laid flat such that a plan view was visible. One can see from such a theoretical plan view that the forward leaning lines represent areas of the flat cylindrical portions 48 disposed alternatingly between the first helically shaped extensions 18, or as now described portions 18. This then forms the base of the structure that is further represented in the embodiments of FIGS. 14B-14F that do include a plurality of micro-grooves.

Figure 14B:
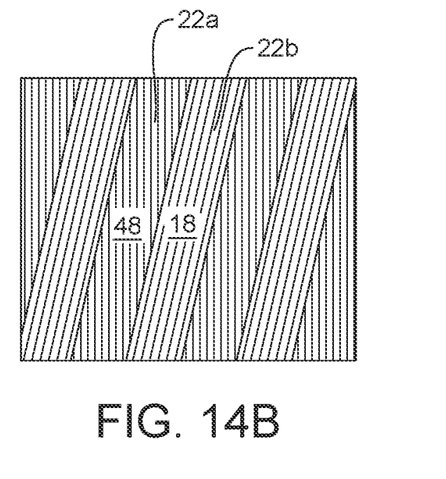
FIG. 14B is the structure of FIG. 14A showing one embodiment of how micro-grooves could be disposed on the flat and helical portions of the inside circumferential surface of the wiper element.

FIG. 14B shows an embodiment that represents what can best be seen in FIG. 8, where the micro-grooves 22a along the portion 48 have no pitch and are simply disposed adjacent to one another. The micro-grooves 22b along the portion 18 are pitched to match the pitch of the first helically shaped extension.

Figure 14C:
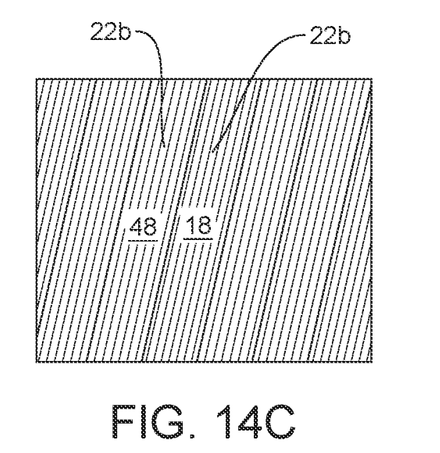
FIG. 14C is the structure of FIG. 14A showing another embodiment of how micro-grooves could be disposed on the flat and helical portions of the inside circumferential surface of the wiper element.

FIG. 14C shows another embodiment where the micro-grooves 22b are disposed the same whether they are along portion 18 or portion 48. Here, the micro-grooves are parallel to the pitch of the first helically shaped extension.

Figure 14D:
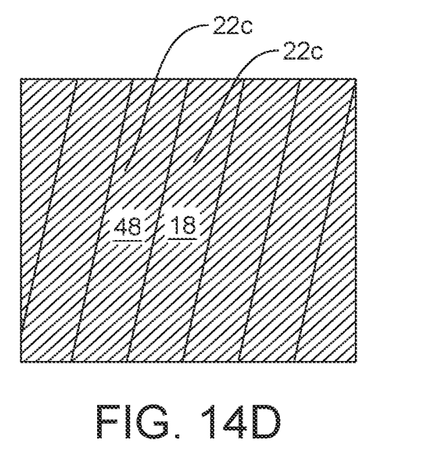
FIG. 14D is the structure of FIG. 14A showing another embodiment of how micro-grooves could be disposed on the flat and helical portions of the inside circumferential surface of the wiper element.

FIG. 14D shows another embodiment where the micro-grooves 22c are pitched more aggressively than the pitch of the first helically shaped extensions 18 along both portions 18 and 48.

Figure 14E:
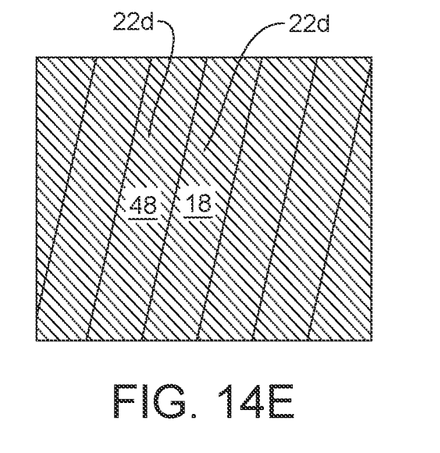
FIG. 14E is the structure of FIG. 14A showing another embodiment of how micro-grooves could be disposed on the flat and helical portions of the inside circumferential surface of the wiper element.

FIG. 14E shows another embodiment where the micro-grooves 22d are pitched in an opposite direction in comparison to the first helically shaped extensions along both portions 18 and 48.

Figure 14F:
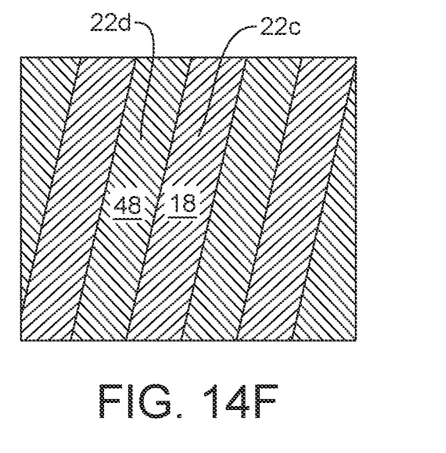
FIG. 14F is the structure of FIG. 14A showing another embodiment of how micro-grooves could be disposed on the flat and helical portions of the inside circumferential surface of the wiper element.

FIG. 14F shows another embodiment where the micro-grooves 22d along the portion 48 are in the opposite direction to the first helically shaped extensions. Then, the micro-grooves 22c are disposed more aggressively than the first helically shaped extensions along the portion 18. As will be understood by those skilled in the art, various embodiments may be made from the embodiments shown in FIGS. 14B-14F, as this teaching is not meant to be limited to just the embodiments shown and taught herein.

Although several embodiments have been described in detail for purposes of illustration, various modifications may be made to each without departing from the scope and spirit of the invention. Accordingly, the invention is not to be limited, except as by the appended claims.

NUMERALS 10 wiper seal assembly
11 ball screw actuator
12 wiper element
13 longitudinal axis
14 front side
15 back side
16 outside circumferential surface
17 inside circumferential surface
18 first helically shaped extension
19 roller ball screw thread
20 shaft
21 at least a portion
22 plurality of micro-grooves
23 ice breaker element
24 front side
25 back side
26 outside circumferential surface
27 inside circumferential surface
28 second helically shaped extension
29 ice breaker lip
30 helical profile
31 similar helical direction
32 opposite helical direction
33 edge, ice breaker lip
34 annular channel
35 spring element
36 flat ribbon coil spring
37 U-shape
38 open top 39 outer diameter grease sealing lip
40 inner diameter grease sealing lip
41 outer housing
42 grease side
43 environmental side
44 at least one finger
45 at least one recess
46 at least one tab
47 at least one recess
48 flat cylindrical portion

What is claimed is:

1. A wiper seal assembly configured for sealing a ball screw actuator, comprising:
a wiper element annularly disposed about a longitudinal axis;
the wiper element defining a front side opposite a back side, the front and back sides being generally perpendicular to the longitudinal axis;
the wiper element defining an outside circumferential surface opposite an inside circumferential surface, the outside and inside circumferential surfaces being generally parallel with longitudinal axis;
wherein the inside circumferential surface comprises a first helically shaped extension extending towards the longitudinal axis, wherein the first helically shaped extension is configured to be disposed within a roller ball screw thread of a shaft of the ball screw actuator, wherein the shaft is configured to be aligned along the longitudinal axis;
wherein at least a portion of the first helically shaped extension comprises a plurality of micro-grooves formed on the inside circumferential surface, wherein the plurality of micro-grooves is configured to make contact with the roller ball screw thread of the shaft of the ball screw actuator; and
an ice breaker element annularly disposed about the longitudinal axis;
the ice breaker element defining a front side opposite a back side, the front and back sides being generally perpendicular to the longitudinal axis;
the ice breaker element defining an outside circumferential surface opposite an inside circumferential surface, the outside and inside circumferential surfaces being generally parallel with longitudinal axis;
wherein the inside circumferential surface comprises a second helically shaped extension extending towards the longitudinal axis, wherein the second helically shaped extension is configured to be disposed within the roller ball screw thread of the shaft of the ball screw actuator;
wherein the second helically shaped extension extends to the front side of the ice breaker element forming an ice breaker lip;
wherein the wiper element is disposed adjacent to the ice breaker element with the back side of the wiper element being adjacent to the back side of the ice breaker element; and
wherein the wiper element and ice breaker element are mechanically locked in rotation in comparison to one another.

2. The wiper seal assembly of claim 1, wherein the plurality of micro-grooves is adjacently disposed next to one another, each micro-groove of the plurality of micro-grooves being annular disposed about the longitudinal axis and not following a helical profile.

3. The wiper seal assembly of claim 1, wherein the plurality of micro-grooves follow a helical profile that is in a similar helical direction in comparison to the first helically shaped extension.

4. The wiper seal assembly of claim 1, wherein the plurality of micro-grooves follow a helical profile that is in an opposite helical direction in comparison to the first helically shaped extension.

5. The wiper seal assembly of claim 1, wherein the first helically shaped extension is helically aligned in comparison to the second helically shaped extension, wherein both the first and second helically shaped extensions are configured to be disposed within the roller ball screw thread of the shaft of the ball screw actuator.

6. The wiper seal assembly of claim 1, wherein an edge of the ice breaker lip is configured to be at or less than 0.012 inches from the roller ball screw thread of the shaft of the ball screw actuator.

7. The wiper seal assembly of claim 1, wherein the front side of the wiper element includes an annular channel formed therein disposed about the longitudinal axis.

8. The wiper seal assembly of claim 7, including an annularly shaped metallic spring element disposed within the annular channel.

9. The wiper seal assembly of claim 8, wherein the spring element comprises a flat ribbon coil spring.

10. The wiper seal assembly of claim 8, wherein the spring element comprises a U-shape in cross section, wherein an open top of the U-shape is pointing along the longitudinal axis and away from the back side of the wiper element.

11. The wiper seal assembly of claim 8, wherein the front side of the wiper element comprises an outer diameter grease sealing lip and an inner diameter grease sealing lip separated by the annular channel.

12. The wiper seal assembly of claim 11, wherein the wiper element comprises PTFE, unfilled PTFE, blended PTFE, glass moly filled PTFE, PEEK and/or thermoplastic material.

13. The wiper seal assembly of claim 11, wherein the ice breaker element comprises aluminum bronze and/or stainless steel.

14. The wiper seal assembly of claim 1, wherein the wiper element and the ice breaker element are not the same materials.

15. The wiper seal assembly of claim 1, wherein, when the wiper seal assembly is installed between an outer housing and the shaft of the ball screw actuator, the front side of the wiper element is configured to be disposed towards a grease side and the front side of the ice breaker element is configured to be disposed towards an environmental side.

16. The wiper seal assembly of claim 1, including at least one finger extending parallel to the longitudinal axis from the back side of the ice breaker element towards the wiper element.

17. The wiper seal assembly of claim 16, including at least one recess formed in the back side of the wiper element, wherein the at least one finger of the ice breaker element is disposed within the at least one recess of the wiper element and mechanically locks in rotation the wiper element in comparison to the ice breaker element.

18. The wiper seal assembly of claim 1, including at least one tab extending radially to the longitudinal axis from the outside circumferential surface of the ice breaker element, wherein the at least one tab is configured to be disposed within at least one recess formed in an outer housing and mechanically locks in rotation the ice breaker element in comparison to the outer housing.

19. A wiper seal assembly configured for sealing a ball screw actuator, comprising:
- a wiper element annularly disposed about a longitudinal axis, the wiper element comprising:
- a front side opposite a back side, the front and back sides being generally perpendicular to the longitudinal axis;
- an outside circumferential surface opposite an inside circumferential surface, the outside and inside circumferential surfaces being generally parallel with longitudinal axis;
- wherein the inside circumferential surface comprises a first helically shaped extension extending towards the longitudinal axis, wherein the first helically shaped extension is configured to be disposed within a roller ball screw thread of a shaft of the ball screw actuator, wherein the shaft is configured to be aligned along the longitudinal axis;
- wherein at least a portion of the first helically shaped extension comprises a plurality of micro-grooves formed on the inside circumferential surface, wherein the plurality of micro-grooves is configured to make contact with the roller ball screw thread of the shaft of the ball screw actuator;
- wherein the front side of the wiper element includes an annular channel formed therein disposed about the longitudinal axis;
- at least one recess formed in the back side of the wiper element;
- an ice breaker element annularly disposed about the longitudinal axis, the wiper element comprising:
- a front side opposite a back side, the front and back sides being generally perpendicular to the longitudinal axis;
- an outside circumferential surface opposite an inside circumferential surface, the outside and inside circumferential surfaces being generally parallel with longitudinal axis;
- wherein the inside circumferential surface comprises a second helically shaped extension extending towards the longitudinal axis, wherein the second helically shaped extension is configured to be disposed within the roller ball screw thread of the shaft of the ball screw actuator;
- wherein the second helically shaped extension extends to the front side of the ice breaker element forming an ice breaker lip;
- at least one finger extending parallel to the longitudinal axis from the back side of the ice breaker element towards the wiper element;
- at least one tab extending radially to the longitudinal axis from the outside circumferential surface of the ice breaker element, wherein the at least one tab is configured to be disposed within at least one recess formed in an outer housing and mechanically locks in rotation the ice breaker element in comparison to the outer housing; and
- an annularly shaped metallic spring element disposed within the annular channel of the wiper element;
- wherein the wiper element is disposed adjacent to the ice breaker element with the back side of the wiper element being adjacent to the back side of the ice breaker element;
- wherein the at least one finger of the ice breaker element is disposed within the at least one recess of the wiper element and mechanically locks in rotation the wiper element in comparison to the ice breaker element, wherein the wiper element and ice breaker element are mechanically locked in rotation in comparison to one another but are not press fit within one another;
- wherein the first helically shaped extension is helically aligned in comparison to the second helically shaped extension, wherein both the first and second helically shaped extensions are configured to be disposed within the roller ball screw thread of the shaft of the ball screw actuator;
- wherein, when the wiper seal assembly is installed between the outer housing and the shaft of the ball screw actuator, the front side of the wiper element is configured to be disposed towards a grease side and the front side of the ice breaker element is configured to be disposed towards an environmental side.

20. The wiper seal assembly of claim 19, wherein the plurality of micro-grooves follow a helical profile that is in a similar helical direction in comparison to the first helically shaped extension.

* * * * *